United States Patent [19]

Ha

[11] Patent Number: 5,585,201
[45] Date of Patent: Dec. 17, 1996

[54] RADIATION-CURABLE COMPOSITION COMPRISING A POLYDIMETHYLSILOXANE

[75] Inventor: Chau T. Ha, St. Paul, Minn.

[73] Assignee: Minnesota Mining and Manufacturing Company, St. Paul, Minn.

[21] Appl. No.: 463,157

[22] Filed: Jun. 5, 1995

[51] Int. Cl.$^6$ .................................................. B32B 31/28
[52] U.S. Cl. ..................... 428/64.4; 428/64.2; 428/64.1
[58] Field of Search ..................... 522/99; 428/447, 428/64.1, 64.4, 63.3, 65.8, 64.2

[56] References Cited

U.S. PATENT DOCUMENTS

| Re. 33,737 | 11/1991 | Hida et al. | 385/141 |
|---|---|---|---|
| 4,013,696 | 3/1977 | Babbitt et al. | 428/412 |
| 4,315,269 | 2/1982 | Bloom et al. | 346/135.1 |
| 4,395,496 | 7/1983 | Wittmann et al. | 523/107 |
| 4,508,884 | 4/1985 | Wittmann et al. | 526/279 |
| 4,582,781 | 4/1986 | Chen et al. | 430/527 |
| 4,596,740 | 6/1986 | Tsukane | 428/336 |
| 4,806,571 | 2/1989 | Knobel et al. | 521/107 |
| 4,814,257 | 3/1989 | Galloway | 430/278 |
| 4,963,438 | 10/1990 | Weitemeyer et al. | 428/447 |
| 4,976,741 | 12/1990 | Hisamoto et al. | 8/115.6 |
| 4,978,726 | 12/1990 | Döhler et al. | 525/479 |
| 5,176,943 | 1/1993 | Woo | 428/64 |
| 5,233,597 | 8/1993 | Nakayama et al. | 369/275.1 |
| 5,268,211 | 12/1993 | Soga et al. | 428/64 |
| 5,296,263 | 3/1994 | Soga et al. | 427/130 |

FOREIGN PATENT DOCUMENTS

| 0465269A2 | 1/1992 | European Pat. Off. |
|---|---|---|
| 3-172358 | 7/1991 | Japan . |
| 3-160642 | 7/1991 | Japan . |
| 4-149280 | 5/1992 | Japan . |
| 4-180970 | 6/1992 | Japan . |
| 4-264167 | 9/1992 | Japan . |
| 4-306266 | 10/1992 | Japan . |
| 4-288312 | 10/1992 | Japan . |
| 5-105726 | 4/1993 | Japan . |
| 6-136355 | 5/1994 | Japan . |
| 6-136354 | 5/1994 | Japan . |

*Primary Examiner*—Ralph H. Dean
*Attorney, Agent, or Firm*—Gary L. Griswold; Walter N. Kirn; Daniel C. Schulte

[57] ABSTRACT

A radiation-curable composition that contains a radiation-curable component and a radiation-curable polydimethylsiloxane compound. The radiation-curable polydimethylsiloxane compound contains a polyoxyalkylene segment and is compatible with the radiation-curable component, so that the cured composition is relatively free from oranger-peel texture, haze, etc. Further, the cured composition provides improved frictional properties. The composition contains a significantly smaller amount of the polydimethylsiloxane than has been previously used. The composition is especially useful when applied to an optical recording disk.

12 Claims, 1 Drawing Sheet

RADIATION-CURABLE COMPOSITION COMPRISING A POLYDIMETHYLSILOXANE

FIELD OF THE INVENTION

The present invention relates to a radiation-curable composition comprising a polydimethylsiloxane compound. More specifically, the present invention relates to the use of a polydimethylsiloxane compound in a radiation-curable composition, where the polydimethylsiloxane compound comprises a polyoxyalkylene segment. The radiation-curable compositions are particularly useful with coatings on magneto-optical recording media.

BACKGROUND OF THE INVENTION

Magneto-optical recording media are typically constructed of a magneto-optical recording layer provided on a transparent substrate of, for example, glass or plastic. The recording layer is typically made of a metal material, and can record data either optically (by recording phase changes) or magnetically (by recording direction of magnetization).

To magnetically record data onto the recording layer, a laser beam is projected on a portion of the recording layer, the laser heats that portion of the recording layer, increasing its temperature to above the material's Curie temperature, or to a point above the vicinity of the magnetic compensation temperature. At this temperature, the magnetic coercive force (Hc) of this portion of the recording layer becomes zero or substantially zero. An external magnetic field (bias magnetic field) is then applied to the heated portion of the recording layer. When the laser beam energy is removed, the temperature of the portion of the magnetic recording medium is reduced, and the magnetization is recorded. This type of recording is referred to as thermomagnetic recording.

To record the direction of the external magnetic field at high speeds, it is desirable to make the magnetic head (i.e., a coil and coil core) of the external magnetic field generating device as small as possible. However, this results in a smaller magnetic field. In order to compensate for the reduced size of the magnetic recording field, the distance between the magnetic head and the magnetic recording medium must also be reduced. For some applications, the distance between the magnetic head and the magnetic recording medium is in the range of microns. As an example, in applications capable of direct over-write recording (re-recording without first erasing previously recorded data), the gap between the magnetic head and the disk can be as small as a few microns (μm).

With such small gaps between the magnetic recording head and the magneto-optical disk, there is a danger of the recording head contacting or "crashing" onto the disk during operation, while the disk is being rotated at high speed, resulting in injury to the head or loss of data from the disk.

In order to minimize any potential damage caused by the magnetic head crashing into the magneto-optic disk, magneto-optic recording media may optionally comprise a coating that acts as a lubricating layer. The lubricating layer has a relatively low coefficient of friction. Therefore, when contact occurs between a disk and a magnetic head, even at very high speeds, the lubricating layer prevents damage of the head or disk by allowing the head to slip away from the disk.

Past coatings have used silicone compounds as lubricating agents. However silicone compounds, and especially polydimethylsiloxanes, can tend to be incompatible with the radiation-curable components of coating solutions. Polydimethylsiloxane compounds that are mixed with these radiation-curable components may result in coated surfaces having cosmetic defects such as hazing, an orange peel texture, or other cosmetic imperfections.

SUMMARY OF THE INVENTION

The present invention relates to a radiation-curable composition that comprises a radiation-curable component and a radiation-curable polydimethylsiloxane compound. The radiation-curable polydimethylsiloxane compound comprises a polyoxyalkylene segment. This polydimethylsiloxane compound is compatible with radiation-curable components, so the cured composition of the present invention has a cosmetically acceptable appearance. The cured composition is relatively free from orange-peel texture, haze, etc. Further, the cured composition can provides improved frictional properties.

Another aspect of the present invention is an optical recording disk comprising a cured coating of the above-described radiation-curable composition.

DESCRIPTION OF THE PREFERRED EMBODIMENTS

Figure 1:
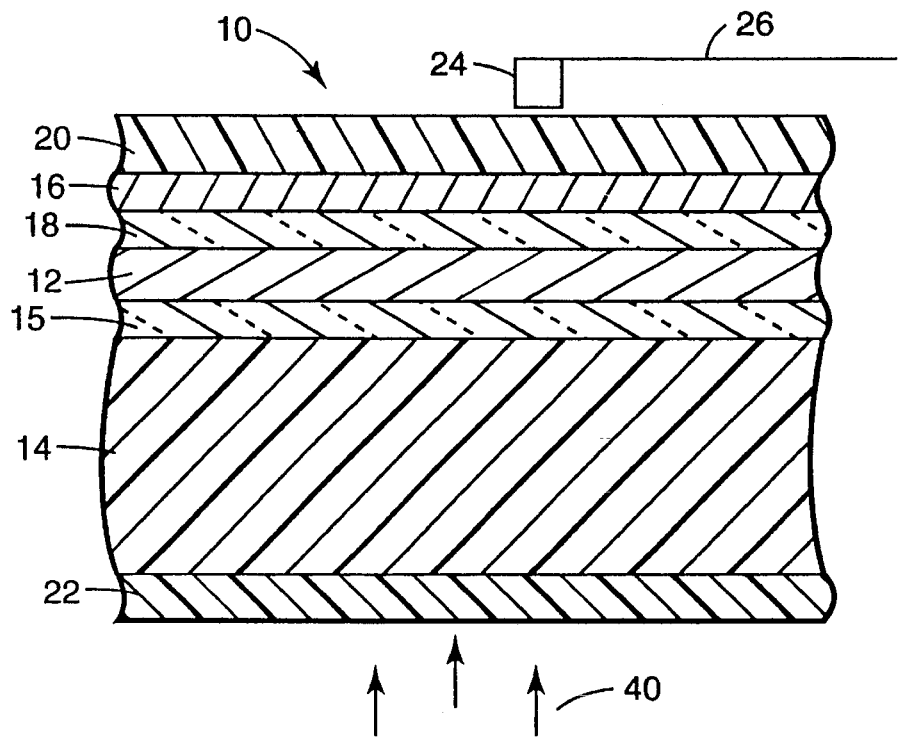
FIG. 1 shows a schematic cross-section of an illustrative magneto-optic recording disk which comprises a coating of the composition of the present invention.

FIG. 1 shows a greatly enlarged schematic cross-section through a portion of an illustrative magneto-optic ("MO") recording disk 10. It is to be understood, however, that although the present application illustrates the use of the present invention with MO media, especially MO media suitable for direct overwrite recording, the coating compositions of the present invention are not limited to use on MO media, but rather are suitable for use in a wide variety of applications where reduced frictional properties are desired.

Referring to FIG. 1, a recording layer 12 is supported by a transparent substrate 14. A film 16 having a reflective surface is disposed on recording layer 12, on the side opposite of the substrate 14. Film 16 will reflect incident light 40, which will have been transmitted through the recording layer 12 a first time, back through the recording layer 12 a second time. Optionally, transparent dielectric layers 15 and 18 may be disposed on one or both sides of the recording layer 12, and between substrate 14 and film 16. As is known in the art, such dielectric layers enhance the optical signal from the optical recording layer 12 and also protect the recording layer 12 from oxidation or corrosion due to heat, humidity, or chemical reactions with impurities. A hardcoat layer 22 may optionally be disposed on the substrate 14, opposite the recording layer 12. The hardcoat layer 22 serves to protect the substrate 14 from mechanical damage. A recording head 24 is supported over the disk 10 by means of a suspension 26. When the disk 10 is rotated, the head 24 floats over the disk 10 with a small gap between the disk 10 and the head 24.

The substrate 14, recording layer 12, film 16, hardcoat layer 22, and dielectric layers 15 and 18 can be of any type known in the art. Coating layer 20 is a cured composition of the present invention which in the example illustrated by FIG. 1 is disposed over the film 16. The coating layer 20 comprises a radiation-curable component, and a radiation-curable polydimethylsiloxane compound that includes a polyoxyalkylene segment.

In the practice of the present invention, the radiation-curable component cures upon exposure to radiation (e.g., ultraviolet radiation, electron beam radiation, etc.); preferably UV radiation. Useful radiation-curable components are capable of being combined with the other components of the present invention to provide an uncured admixture that provides good wetting and flow characteristics, that allows for a relatively fast cure, and that has a viscosity sufficiently low to be spin coated. For example, the viscosity of an admixture comprising a radiation- curable component and a radiation-curable polydimethylsiloxane compound is preferably no higher than about 100 centipoise at a temperature of 25° C. If the viscosity of the uncured admixture is too high the admixture may be unsuitable for use with the spin coating techniques which are most desirably used to apply the uncured coating composition to a magneto-optical recording media substrate. Preferably, the radiation-curable component will cure to provide a coating with good abrasion resistance and good adhesion to a substrate, as well as reduced frictional properties.

The radiation-curable component of the present invention can be comprised of one or more monomeric and/or oligomeric radiation-curable components. Each monomeric or oligomeric component may comprise one or more reactive vinyl unsaturated moiety that will polymerize upon being exposed to suitable radiation. Preferred radiation-curable components include (meth)acrylate-functional monomers and oligomers having the general formula:

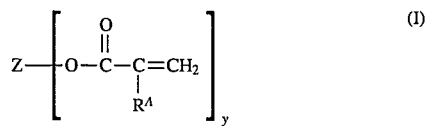

(I)

wherein $R^A$ is preferably hydrogen or —CH$_3$, and y is preferably in the range from about 1 to 6. The precise nature of Z is not critical. Representative Z groups include those that comprise, for example, urethanes, polyurethanes, esters, polyesters, oxyalkylene groups, epoxies, alkyl groups, aryl-containing groups, and allyl-containing groups, etc., any of which can be straight, branched, cyclic, aromatic, saturated, or unsaturated.

The radiation-curable component of the present invention may comprise two or more different mono- or multifunctional radiation-curable compounds of various molecular weights. Preferably, the radiation-curable component of the present invention comprises a (meth)acrylate-functional diluent, and a multi-functional oligomer.

For the purposes of the present invention, (meth)acrylate-functional diluents, also referred to herein as "reactive diluents," are relatively low molecular weight mono-, di-, or tri- functional, non-aromatic, (meth)acrylate monomers; i.e., y in formula I equals 1, 2, or 3. These relatively low molecular weight reactive diluents are advantageously of a relatively low viscosity, e.g., less than about 30 centipoise (cps) at 25C. Di- or tri- functional, non-aromatic (meth)acrylates are generally preferred over mono-functional non-aromatic (meth)acrylates because di-and tri- functional non-aromatic (meth)acrylates allow for quicker cure time. Preferred reactive diluents include 1,6-hexanediol di(meth)acrylate (HDODA from Radcure), tripropylene glycol di(meth)acrylate, isobornyl (meth)acrylate (IBOA, Radcure), 2-(2-ethoxyethoxy) ethyl (meth)acrylate (sold under the trade name Sartomer 256 from SARTOMER Company, Inc. of Exton, Pa.), n-vinyl formamide (Sartomer 497); tetrahydrofurfuryl (meth)acrylate (Sartomer 285), polyethylene glycol di(meth)acrylate (Sartomer 344), tripropylene glycol di(meth)acrylate (Radcure), neopentyl glycol dialkoxy di(meth)acrylate, polyethyleneglycol di(meth)acrylate, trimethylpropane tri(meth)acrylate (TMPTA) and mixtures thereof.

Another useful radiation-curable component of the present invention is the class of multi-functional (meth)acrylate oligomers having two or more (meth)acrylate groups, and preferably having an average molecular weight (Mw) in the range from about 400 to 2000. Preferred multi-functional (meth)acrylate oligomers include polyester (meth)acrylates, polyurethane (meth)acrylates, and (meth)acrylated epoxy (meth)acrylates. (Meth)acrylated epoxy (meth)acrylates are most preferred because they tend to have a relatively low viscosity and therefore allow a uniform layer to be applied by the spin coating method. Specifically, preferred multi-functional (meth)acrylate oligomers include those commercially available from UCB Chemicals, Inc. of Smyrna Ga. under the trade name Ebecryl (Eb): Eb40 (tetrafunctional acrylated polyester oligomer), Eb80 (polyester tetra-functional (meth)acrylate oligomer), Eb81 (multifunctional (meth)acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (difunctional bisphenol-A oligomer acrylate), Eb3604 (multifunctional polyester acrylate oligomer), Eb6602 (trifunctional aromatic urethane acrylate oligomer), Eb8301 (hexafunctional aliphatic urethane acrylate), Eb8402 (difunctional aliphatic urethane acrylate oligomer), and mixtures thereof.

(Meth)acrylate functional diluents are preferably present in the radiation-curable component in amounts in the range from about 20 to 70 parts by weight (pbw) based on 100 parts of the radiation-curable component. Multifunctional (meth)acrylate oligomers having two or more (meth)acrylate groups, and having an average molecular weight in the range from about 400 to 2000 are preferably present in the radiation-curable component in amounts in the range from about 15 to 60 pbw based on 100 parts of radiation-curable component.

The radiation-curable composition may include any useful amount of the radiation-curable component. A useful amount of the radiation-curable component will allow the uncured admixture to be spin coated, and will provide a cured coating with desired frictional and cosmetic properties. Preferably, the radiation-curable component will be present in the radiation-curable composition in an amount in the range from 85 to 98 pbw based on 100 parts radiation-curable composition.

The radiation-curable composition of the present invention comprises a radiation-curable polydimethylsiloxane compound. The polydimethylsiloxane compound comprises one or more vinyl unsaturated moieties. Therefore, upon being exposed to suitable radiation, the polydimethylsiloxane compound will copolymerize with the radiation-curable component. By copolymerizing with the radiation-curable component, the polydimethylsiloxane compound will become an integral part of the cured composition. Preferably, the vinyl unsaturated group of the polydimethylsiloxane compound is a (meth)acrylate group and the radiation-curable polydimethylsiloxane compound is a polydimethylsiloxane acrylate.

Preferred radiation-curable polydimethylsiloxane compounds comprise a polyoxyalkylene segment (e.g., polyoxymethylene, polyoxyethylene, polyoxypropylene, etc.), preferably a polyoxypropylene segment. The polyoxyalkylene segment has been shown to improve the compatibility of the radiation-curable polydimethylsiloxane compound with the radiation-curable component. With improved compatibility, the radiation-curable polydimethylsiloxane compound can be more easily dissolved in the radiation-curable component. In the absence of the polyoxyalkylene segment, the radiation-curable polydimethylsiloxane compound and the radiation-curable component may tend to form two phases when combined, leading to haze, orange peel, craters, ghosting, or other surface imperfections upon coating and curing of the composition.

A preferred class of radiation-curable polydimethylsiloxane compounds are the polydimethylsiloxane acrylate compounds having the general formula:

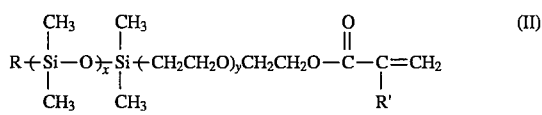

(II)

wherein R is hydrogen or an alkyl group, R' is preferably H or —$CH_3$, x is preferably in the range from about 1–7, most preferably 7, and y is preferably in the range from about 17–25, most preferably 17.

The radiation-curable composition of the present invention may contain various amounts of radiation-curable polydimethylsiloxane compound. A useful amount will provide a cured radiation-curable composition that has improved frictional properties, while at the same time providing a cured coating with an acceptable cosmetic appearance. It is preferred to use from about 0.1 to 5 pbw, more preferably from about 0.1 to 2 pbw, and most preferably from about 0.2 to 1 pbw, of the radiation-curable polydimethylsiloxane compound, based on 100 pans radiation-curable composition.

The radiation-curable composition of the present invention may optionally contain other ingredients known in the art, for example photoinitiators, anticorrosion agents, surfactants, or antistatic agents.

Examples of useful photoinitiators include, but are not limited to Darocure 1173, Darocure 4265, Irgacure 184, and Irgacure 907, all commercially available from Ciba-Geigy of Ardsley, N.Y. Preferred photoinitiators are those that contain a phosphine oxide group, for example 2,4,6-[trimethylbenzoyldiphenyl phosphine] oxide, bis(2,6-dimethyoxybenzoyl)-2,4,4-trimethylpentylphosphine oxide, triphenylphosphine, triphenylphosphite, and mixtures thereof. The photoinitiator can be present in amounts in the range from 0.25 to 15 parts by weight, and is preferably present in the range from about 4–12 pbw based on 100 parts by weight of the radiation-curable composition.

Preferably, the radiation-curable composition of the present invention is prepared from an uncured admixture of ingredients. This uncured admixture can be applied to a magneto-optic recording media, such as the recording layer of the magneto-optic recording disk 10, using spin coating techniques, electro-spray techniques, or vacuum deposition. Preferably, the formulation of the present invention is applied to a substrate using a spin coating technique, and the formulation is then cured by ultraviolet radiation to form a cured composition.

Admixtures of the present invention suitable for spin-coating can typically including a radiation-curable component, a radiation-curable polydimethylsiloxane compound, and optionally a photoinitiator and an anticorrosion agent. Advantageously, the viscosity of these admixtures is typically low enough to allow spin coating even without any solvent being added to the composition.

Spin coating allows for the quick and easy production of an extremely uniform coated layer having a thickness of 3 to 20 μm, preferably 3 to 15 μm, more preferably 5 to 15 μm, most preferably from 6 to 10 μm. According to the spin coating technique, an admixture of uncured ingredients is first prepared. The admixture is delivered onto the magneto-optic disk 10 using a conventional spin coating apparatus. Such an apparatus generally includes a dispensing needle, a syringe, and a pump. Dispensing the admixture onto the disk may involve either manually or automatically dispensing the fluid by means of a syringe and a needle. Preferably, the disk to be coated is pre-cleaned with ionized air prior to spin coating. For admixtures having a viscosity in the range from 5 to 100 centipoise, a needle pressure of 5 to 20 psi (25 to 103 mm Hg) delivers a suitable amount of the admixture onto the center of a disk in about 2 seconds when the disk is spiraling at 30 to 100 rpm. Preferably, an in-line filter (0.1 to 2 μm) is used to remove particles from the admixture before the admixture is allowed to pass through the dispensing needle. After delivery, a high spinoff speed of 1800 to 3500 rpm for 3 to 5 seconds disperses the solution into a thin, uniform coating.

The uncured admixture is then cured with a suitable form of radiation. Preferably, curing occurs in a chamber fitted with an exhaust fan. Typically, the exhaust fan is operated during curing in order to remove low boiling, volatile components from the chamber. Also, spin coating and/or curing preferably occurs in an inert atmosphere. For example, an atmosphere comprising 90% or more nitrogen.

The uncured composition of the present invention may be cured using any suitable form of radiation, for example electron beam radiation or ultraviolet radiation. It is preferred that the composition be photocurable, i.e., curable with ultraviolet radiation. Various sources of UV radiation are suitable, including electric powered arc lamps, such as medium pressure or high pressure mercury lamps, and electrodeless lamps such as H-type, D-type, or V-type metal halide lamps. The specific radiation source should be selected to correspond with the absorption spectra of the radiation-curable component, as well as the radiation-curable polydimethylsiloxane compound, and any photoinitiator used. As an example, a UV radiation source operating at wavelengths of between 240 to 450 nm and an energy of 200 to 450 mj/cm$^2$ for 2 to 6 seconds would be preferable.

The objects and advantages of the present invention are further illustrated by the following examples, but the particular materials and amounts thereof recited in these examples, as well as the conditions and details, should not be construed to unduly limit this invention.

EXAMPLES

Samples of radiation-curable compositions were produced from ingredients according to Table 1. The compositions were produced from ingredients of a radiation-curable acrylate, a polydimethylsiloxane acrylate, and a photoinitiator. The samples were UV-curable and did not contain any additional solvent.

TABLE 1

| Components | Control | Sample 1 | Sample 2 | Sample 3 | Comparative Sample 4 |
|---|---|---|---|---|---|
| HDODA (reactive diluent) | 26 | 26 | 26 | 26 | 26 |
| TMPTA | 40 | 40 | 40 | 40 | 40 |
| EB 605 (oligomer) | 23 | 22.9 | 22 | 21 | 22.5 |
| Polydimethylsiloxane 1 | 0.0 | 0.1 | 1 | 2 | 0.0 |
| Polydimethylsiloxane 2 | 0.0 | 0.0 | 0.0 | 0.0 | 0.5 |
| Darocure 4265 | 7 | 7 | 7 | 7 | 7 |
| Irgacure 184 | 3 | 3 | 3 | 3 | 3 |
| Tributyl amine | 1 | 1 | 1 | 1 | 1 |

TMPTA is trimethylpropane tri(meth)acrylate. HDODA is 1,6-hexanediol di(meth)acrylate. The polydimethylsiloxane compound of Samples 1, 2, and 3, designated Polydimethylsiloxane 1 was:

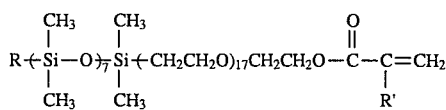

where R and R' are as defined above. The polydimethylsiloxane compound of Comparative Sample 4, designated Polydimethylsiloxane 2, is available from Goldschmidt of Germany, under the trade designation RC 726; it has the formula:

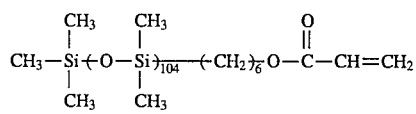

This compound does not contain a polyoxyalkylene group. Polydimethylsiloxane 2 was incompatible with the other ingredients of the radiation-curable coating. The result upon attempting to mix Polydimethylsiloxane 2 with the radiation-curable components was a two phase solution that further resulted in a coating surface with an "orange peel" texture.

Samples 1, 2, 3 and the control were spin coated onto the aluminum surface of a magneto-optical disk using a Convac coater, from Convac of Germany. Each sample was applied by manual dispensing via a syringe fitted with a 0.5 μm disposable filter as the disk was rotated at a dispensing speed of 30–100 rpm for 2–3 seconds, followed by a fast spinning cycle at 2500–3600 rpm for 4 seconds. The compositions were subsequently cured by a Fusion system equipped with an H-type bulb to a "tack-free to touch" surface.

The surfaces of the cured compositions were examined for cosmetic defects such as streaks, orange peel, and haze by visual and microscope inspections. Samples 1, 2, 3 and the control sample were cosmetically acceptable; i.e., each cured coating was free of orange peel, haze, or other surface imperfections.

The surface energy of each sample was estimated using calibrated liquids. Results are given in Table 2.

TABLE 2

| Surface Energy Measurements | |
|---|---|
| Substrates | Surface energy (dynes/cm) |
| Aluminum/chrome surface | >73 |
| Control | 26 |
| Sample 2 | <18 |

Table 2 shows that Sample 2, containing 1% of Polydimethylsiloxane 1, had a lower surface energy than both the aluminum/chromium surface (the reflective layer of the optical recording media), and the Control surface, which contained no polydimethylsiloxane.

Next, the coefficients of friction between a 10 gram magnetic head, and samples 1, 2, 3 and the control sample were measured at various rotation speeds. The results are given in Table 3.

TABLE 3

| Coefficient of friction vs. rotating speed of media | | | | |
|---|---|---|---|---|
| Rotation Speed of Media | Coefficient of Friction | | | |
| (r.p.m.) | Control | Sample 1 | Sample 2 | Sample 3 |
| 0 | 1.9 | 1.5 | 0.6 | 0.6 |
| 100 | 1.9 | 0.5 | 0.2 | 0.13 |
| 200 | 1.8 | 0.33 | 0.18 | 0.12 |
| 300 | 1.7 | 0.28 | 0.17 | 0.11 |
| 400 | 1.6 | 0.18 | 0.17 | 0.11 |
| 500 | 1.5 | 0.18 | 0.17 | 0.11 |
| 600 | 1.4 | 0.17 | 0.17 | 0.11 |
| 700 | 1.4 | 0.17 | 0.17 | 0.11 |

Figure 2:
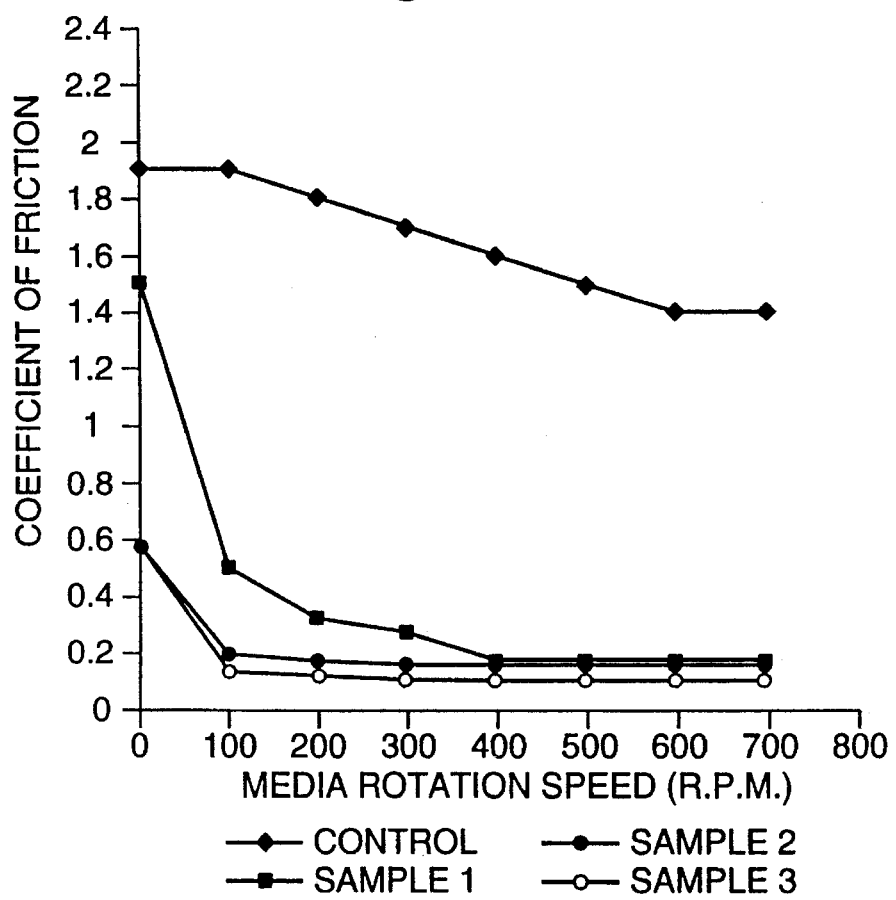
FIG. 2 is a graph of the coefficient of friction versus rotation speed of magneto-optic recording disks of the present invention, and a control.

The data of Table 3 is graphed in FIG. 2. FIG. 2 shows that as the amount of the Polydimethylsiloxane 1 was increased, both the static and the kinetic coefficients of friction decreased.

The above data demonstrate that radiation-curable polydimethylsiloxane acrylates that contain a polyoxyalkylene segment are effective as bonded lubricants for radiation-curable compositions for magneto-optical media. These radiation-curable compositions provide improved frictional properties, and enable a magnetic head to come into intimate contact or direct sliding contact with a disk surface, with a reduced potential for damaging either the head or the media. These compositions would therefore be particularly useful on optical recording disks that are capable of direct overwrite recording.

What is claimed is:

1. An optical recording disk comprising a coating provided on a surface of the disk, wherein the coating is obtained from a radiation-curable composition comprising:

a radiation-curable component; and a radiation-curable polydimethylsiloxane compound, the radiation-curable polydimethylsiloxane compound comprising a polyoxyalkylene segment.

2. The optical recording disk of claim 1, wherein the disk coating has a coefficient of static friction equal to or less than 1.5.

3. The optical recording disk of claim 1, wherein the disk coating has a surface energy of less than 18 dynes per centimeter.

4. The disk of claim 1, wherein the radiation-curable composition comprises:

85–99 parts by weight of the radiation-curable component; and 0.1–5 parts by weight of the radiation-curable polydimethylsiloxane compound, based on 100 parts of radiation-curable composition.

5. The disk according to claim 2, wherein the radiation-curable composition comprises:

85–99 parts by weight of the radiation-curable component; and 0.1 to 2 parts by weight of the radiation-curable polydimethylsiloxane compound.

6. The disk according to claim 4, wherein the polyoxyalkylene is polyoxypropylene.

7. The disk of claim 1, wherein the polydimethylsiloxane compound is:

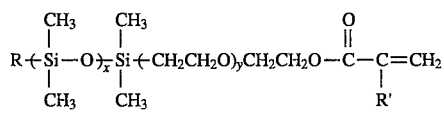

wherein R is hydrogen or an alkyl group, R' is hydrogen or —CH$_3$, x is in the range from about 1 to 7, and y is in the range from about 17 to 25.

8. The disk of claim 7, wherein the polydimethylsiloxane compound is:

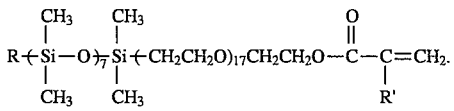

9. The disk of claim 8, wherein the radiation-curable component comprises a (meth)acrylate-functional diluent, and a multi-functional oligomer.

10. The disk of claim 1, wherein the (meth)acrylate-functional diluent is chosen from the group consisting of 1,6-hexanediol di(meth)acrylate, trimethylpropane tri(meth)acrylate, and mixtures thereof; and the multi-functional oligomer comprises bisphenol A epoxy di(meth)acrylate.

11. The disk of claim 10, wherein the disk is capable of direct over-write recording.

12. An optical recording disk comprising a coating provided on a surface of the disk, wherein the coating is obtained from a radiation-curable composition comprising:

from 85 to 90 parts by weight of a radiation-curable component chosen from the group consisting of 1,6-hexanediol di(meth)acrylate, trimethylpropane tri(meth)acrylate, bisphenol A epoxy di(meth)acrylate and mixtures thereof, and from about 0.1 to 5 parts by weight of a polydimethyl siloxane compound having the formula:

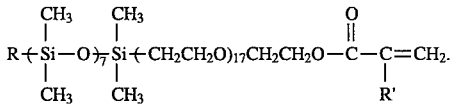

* * * * *

UNITED STATES PATENT AND TRADEMARK OFFICE
CERTIFICATE OF CORRECTION

PATENT NO.: 5,585,201

DATED: December 17, 1996

INVENTOR(S): Ha

It is certified that error appears in the above-identified patent and that said Letters Patent is hereby corrected as shown below:

First page, second column, Abstract, line 6, "oranger-peel" should be --orange-peel--.

Col. 5, line 36, "pans" should be --parts--.

Signed and Sealed this

Fifteenth Day of July, 1997

Attest:

Attesting Officer

BRUCE LEHMAN

Commissioner of Patents and Trademarks